US011163539B2

(12) United States Patent
Trim et al.

(10) Patent No.: US 11,163,539 B2
(45) Date of Patent: Nov. 2, 2021

(54) VIRTUAL DETECTION AND TECHNICAL ISSUE MODIFICATION

(71) Applicant: INTERNATIONAL BUSINESS MACHINES CORPORATION, Armonk, NY (US)

(72) Inventors: Craig M. Trim, Ventura, CA (US); Lakisha R. S. Hall, Upper Marlboro, MD (US); Gandhi Sivakumar, Melbourne (AU); Kushal Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/736,354

(22) Filed: Jan. 7, 2020

(65) Prior Publication Data

US 2021/0208851 A1 Jul. 8, 2021

(51) Int. Cl.
*H04L 29/08* (2006.01)
*H04W 76/10* (2018.01)
(Continued)

(52) U.S. Cl.
CPC ............... *G06F 8/33* (2013.01); *G06F 9/547* (2013.01); *G06N 20/00* (2019.01); *G06Q 10/067* (2013.01);
(Continued)

(58) Field of Classification Search
CPC .......... G06F 8/33; G06F 9/547; H04W 76/10; G06N 20/00; G06Q 10/067; H04L 67/34; H04L 43/12; H04L 41/22; H04L 41/0896
See application file for complete search history.

(56) References Cited

U.S. PATENT DOCUMENTS

| 7,751,955 B2 * | 7/2010 | Chinnadurai | ...... G05B 23/0235 701/29.3 |
| 7,920,678 B2 * | 4/2011 | Cooper | ................... G06F 3/167 379/8 |

(Continued)

FOREIGN PATENT DOCUMENTS

| CN | 202261803 U | 5/2012 |
| CN | 106094553 A | 11/2016 |

(Continued)

OTHER PUBLICATIONS

Dinh C. Nguyen et al., Wireless AI: Enabling an AI-Governed Data Life Cycle, 2020, [Retrieved on Jul. 12, 2021], Retrieved from the internet: <URL: https://www.researchgate.net/profile/Peng-Cheng-74/publication/339375691> 41 pp. 1-41 (Year: 2020).*

(Continued)

*Primary Examiner* — Anibal Rivera
(74) *Attorney, Agent, or Firm* — Schmeiser, Olsen & Watts; Maeve M. Carpenter (57) ABSTRACT

A method and system for virtually detecting and modifying technical issues is provided. The method includes enabling virtual software of a hardware controller with respect to a software layer of a fifth generation (5G) telecom communication network. A signal is enabled by a 5G apparatus and a handshaking processes between the hardware controller and the 5G apparatus is executed. In response, metadata structures are parsed and classified. Technical issues associated with hardware and software of devices connected to the 5G telecom communication network are identified and the virtual software is modified for managing and repairing the technical issues. Self-learning software code for executing future processes associated with executing virtual detection and issue modification is generated.

20 Claims, 8 Drawing Sheets

(51) Int. Cl.
  *G06F 8/33* (2018.01)
  *G06N 20/00* (2019.01)
  *G06F 9/54* (2006.01)
  *G06Q 10/06* (2012.01)
  *H04W 84/04* (2009.01)
  *H04L 12/26* (2006.01)
  *H04L 12/24* (2006.01)

(52) U.S. Cl.
  CPC ............ H04L 67/34 (2013.01); H04W 76/10 (2018.02); *H04L 41/0896* (2013.01); *H04L 43/12* (2013.01); *H04W 84/042* (2013.01)

(56) References Cited

U.S. PATENT DOCUMENTS

| | | | | |
|---|---|---|---|---|
| 10,042,636 | B1* | 8/2018 | Srivastava | G06Q 10/06 |
| 10,206,131 | B2* | 2/2019 | Sharma | H04L 41/14 |
| 10,699,703 | B2* | 6/2020 | Green | H04M 3/523 |
| 10,833,951 | B2* | 11/2020 | Do | H04L 41/147 |
| 2014/0279050 | A1* | 9/2014 | Makar | G06F 16/9535 705/14.66 |
| 2015/0235240 | A1* | 8/2015 | Chang | G06Q 30/0202 705/7.31 |
| 2018/0143803 | A1* | 5/2018 | La Placa | G06F 3/167 |
| 2019/0042867 | A1* | 2/2019 | Chen | G06N 5/022 |
| 2019/0104047 | A1* | 4/2019 | Tejaprakash | H04L 41/22 |
| 2019/0222489 | A1* | 7/2019 | Shan | H04L 12/1407 |
| 2019/0346860 | A1* | 11/2019 | Houts | G01S 11/04 |
| 2019/0380037 | A1* | 12/2019 | Lifshitz | H04L 43/12 |
| 2020/0027567 | A1* | 1/2020 | Xie | G16B 40/00 |
| 2020/0281037 | A1* | 9/2020 | Cui | H04B 17/318 |
| 2020/0304636 | A1* | 9/2020 | Trim | H04L 67/22 |
| 2020/0356108 | A1* | 11/2020 | Toma | G06K 9/00791 |
| 2020/0413422 | A1* | 12/2020 | Jia | H04W 72/1236 |
| 2021/0004305 | A1* | 1/2021 | Hao | G06F 11/0742 |
| 2021/0014644 | A1* | 1/2021 | Wu | H04W 4/70 |
| 2021/0014671 | A1* | 1/2021 | Jia | H04W 88/023 |
| 2021/0014706 | A1* | 1/2021 | Cui | H04L 41/0668 |
| 2021/0029580 | A1* | 1/2021 | Gupta | H04W 28/0289 |
| 2021/0036752 | A1* | 2/2021 | Tofighbakhsh | H04B 17/12 |
| 2021/0045007 | A1* | 2/2021 | Stawiarski | H04W 28/0284 |
| 2021/0051105 | A1* | 2/2021 | Halepovic | H04L 43/062 |

FOREIGN PATENT DOCUMENTS

| | | |
|---|---|---|
| CN | 208386944 U | 1/2019 |
| CN | 109600745 A | 4/2019 |

OTHER PUBLICATIONS

Adam, I. et al.; Framework for Security Event Management in 5G; Proceedings of the 13th International Conference on Availability, Reliability and Security; Article No. 51; Aug. 27-30, 2018; 7 pages.
Interface that is Intelligent; https://www.payjo.com; retrieved from the Internet Aug. 23, 2019; 6 pages.
Mell, Peter et al.; "The NIST Definition of Cloud Computing;" National Institute of Standards and Technology; Special Publication 800-145; Sep. 2011; 7 pages.

* cited by examiner

VIRTUAL DETECTION AND TECHNICAL ISSUE MODIFICATION

BACKGROUND

The present invention relates generally to a method for virtually detecting technical issues and in particular to a method and associated system for improving hardware and software technology associated with identifying technical issues associated with hardware and software, modifying associated virtual software, and repairing the technical issues.

SUMMARY

A first aspect of the invention provides a virtual detection and issue modification method comprising: enabling, by a processor of a hardware controller, virtual software of the hardware controller with respect to a specialized software layer of a fifth generation (5G) telecom communication network; accepting, by the processor via a multi-channel monitoring tool, a signal enabled by a 5G apparatus; executing, by the processor in response to the accepting, a handshaking processes between the hardware controller and the 5G apparatus; parsing and classifying, by the processor in response to the handshaking process, metadata structures retrieved from the specialized software layer; identifying, by the processor based on analysis of the signal and results of the parsing and classifying, technical issues associated with hardware and software of devices connected to the 5G telecom communication network; modifying, by the processor based on the technical issues, the virtual software such that modified virtual software is generated for communications with respect to managing and repairing the technical issues; repairing, by the processor executing the modified virtual software, the technical issues; and generating, by the processor, self-learning software code for executing future processes associated with executing the virtual detection and issue modification method.

A second aspect of the invention provides a computer program product, comprising a computer readable hardware storage device storing a computer readable program code, the computer readable program code comprising an algorithm that when executed by a processor of hardware controller implements a virtual detection and issue modification method, the method comprising: enabling, by the processor, virtual software of the hardware controller with respect to a specialized software layer of a fifth generation (5G) telecom communication network; accepting, by the processor via a multi-channel monitoring tool, a signal enabled by a 5G apparatus; executing, by the processor in response to the accepting, a handshaking processes between the hardware controller and the 5G apparatus; parsing and classifying, by the processor in response to the handshaking process, metadata structures retrieved from the specialized software layer; identifying, by the processor based on analysis of the signal and results of the parsing and classifying, technical issues associated with hardware and software of devices connected to the 5G telecom communication network; modifying, by the processor based on the technical issues, the virtual software such that modified virtual software is generated for communications with respect to managing and repairing the technical issues; repairing, by the processor executing the modified virtual software, the technical issues; and generating, by the processor, self-learning software code for executing future processes associated with executing the virtual detection and issue modification method.

A third aspect of the invention provides a hardware controller comprising a processor coupled to a computer-readable memory unit, the memory unit comprising instructions that when executed by the processor implements a virtual detection and issue modification method comprising: enabling, by the processor, virtual software of the hardware controller with respect to a specialized software layer of a fifth generation (5G) telecom communication network; accepting, by the processor via a multi-channel monitoring tool, a signal enabled by a 5G apparatus; executing, by the processor in response to the accepting, a handshaking processes between the hardware controller and the 5G apparatus; parsing and classifying, by the processor in response to the handshaking process, metadata structures retrieved from the specialized software layer; identifying, by the processor based on analysis of the signal and results of the parsing and classifying, technical issues associated with hardware and software of devices connected to the 5G telecom communication network; modifying, by the processor based on the technical issues, the virtual software such that modified virtual software is generated for communications with respect to managing and repairing the technical issues; repairing, by the processor executing the modified virtual software, the technical issues; and generating, by the processor, self-learning software code for executing future processes associated with executing the virtual detection and issue modification method.

The present invention advantageously provides a simple method and associated system capable of accurately detecting and resolving technical issues.

DETAILED DESCRIPTION

Figure 1:
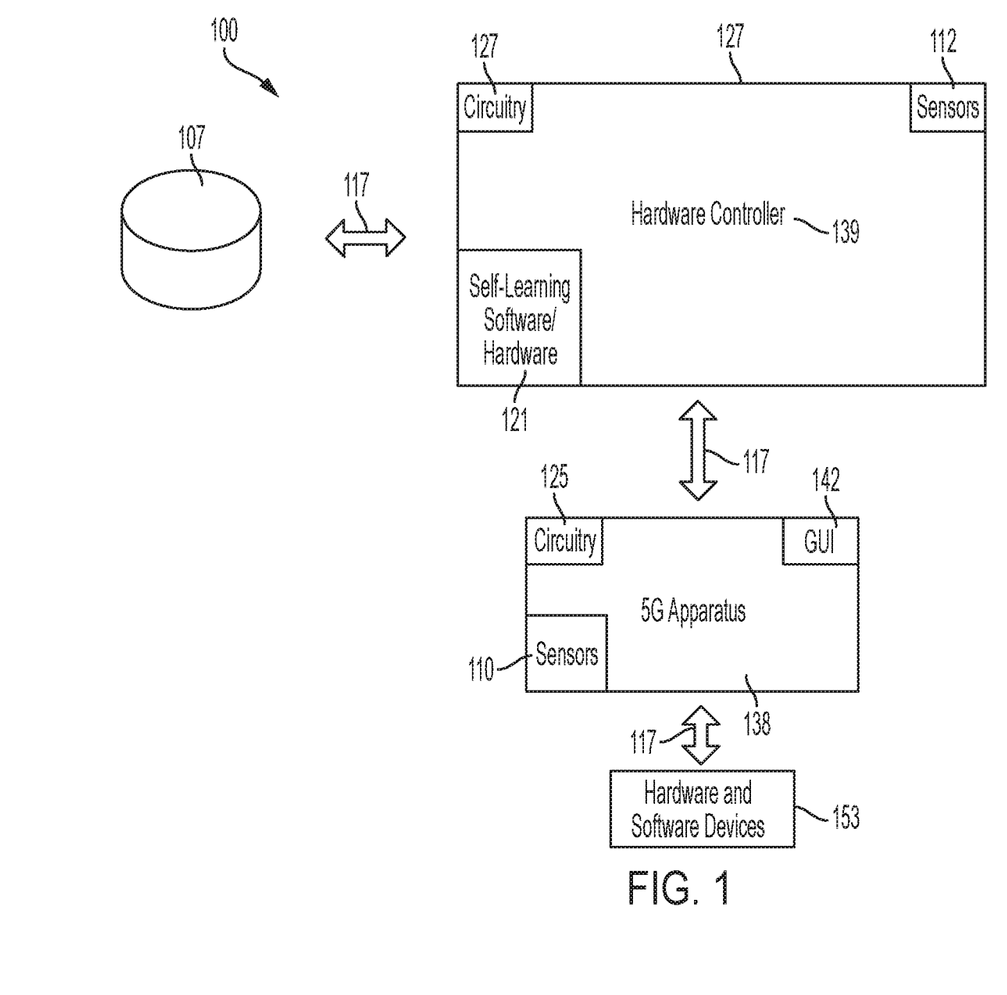
FIG. 1 illustrates a system for improving hardware and software technology associated with identifying and resolving technical issues associated with hardware and software, in accordance with embodiments of the present invention.

FIG. 1 illustrates a system 100 for improving hardware and software technology associated with identifying and resolving technical issues associated with hardware and software, in accordance with embodiments of the present invention. A typical system may enable users to solve specified issues via usage of virtual assistants (VAs) that simulate tasks in a specified ecosystem. Typical VAs are deployed in the field with respect to collecting information from end customers and manipulating situational insights to resolve various issues. Likewise, typical VAs enable troubleshooting processes for information technology (IT) systems delivering various capabilities associated with providing assistance to end users (e.g., a corporate telecom customer contacting a call center for facility management) and technical issue reporting. A telecom service may provide services to enterprise customers. The services may be offered in a bulk format which are internally distributed at a local enterprise level to the users based on requirements. For example, if a company purchased telecom services, the services may be internally distributed to employees based on demand. Associated deployment architectures detecting technical issues may require a report for a local service manager to resolve issues with the telecom service provider. In this case, a service manager at a client end system may be required to perform multiple follow-ups with the telecom service provider for all detected issues. Likewise, the service manager and an external telecom service provider may not be aware of an actual in-depth severity of the technical issue beyond an associated severity level. Additionally, the technical issue may cause a major business impact in the near future thereby causing excessive repair turnaround time and a negative service experience. Likewise, typical systems are unable to autonomously detect increasing issues and proactively enable an associated resolution before the issues are reported via formal channels. Therefore, system 100 is enabled to monitor and detect technical issues at a client location, consume omni-channel monitoring information for telecom services, and autonomously notify major technical issues via a 5G-telecom service based on inferred insights to generate an efficient service repair process.

System 100 enables an improved system and process for enabling a virtual agent (located within a service orchestration layer of a fifth generation (5G) telecom network) to: communicate with the customers using smart omni-channel monitoring tools, collect associated information from email channels, and issue monitoring systems and/or software for logging telecom service issues via means of a dedicated subscribed and secured logical channel of the 5G telecom network. Likewise, system 100 collects and monitors user actions (associated with technical issues) for validation and action categorization. An email monitor and additional omni-channel monitoring tools are configured to collect streamed information from associated hardware and software resources. Subsequently, static and dynamic classification code is executed with respect to the stream information and significance weighting factors (associated with the telecom service issues) are identified. For example, if a telecom issue associated with preventing IP calling is detected and an email indicates that a user is required to access the IP calling features in a specified timeframe, then system 100 collects information from the email, associated IP calls previously made to service manager(s), and communications performed within a ticket logging system and validates detection of the telecom issues. Upon collection of information, a virtual agent proactively notifies a telecom service provider that the telecom issues have been detected within the client organization and may cause potential technical issues. An associated detection signal is generated and transferred to a respective entity within a telecom service center. Additionally, a 5G orchestration service may be connected to the VAs deployed at the telecom service center via means of interconnect out-of-bound APIs for communicating a message to the telecom VAs.

System 100 is enabled to analyze content delivered via user actions, email, and hardware/software channel monitoring tools for determining information insights and detecting technical issues. The analyses process includes analyzing: a user's personal information, an associated technical issue history, a geographical location, a multi-level organization hierarchy, etc. Digital communications with telecom support center VAs are inserted within a service programmability software layer for transmission of updates to a service operation layer that proactively generates a resolution of the technical issue. System 100 further enables a process for detecting technical issue escalation detected within meetings and emails. Likewise, the telecom service provider system proactively repairs the technical issue to obtain a better service expertise and customer satisfaction.

System 100 may be deployed within a service orchestration layer of a 5G telecom network such that data from omni-channel monitoring tools are transmitted via a secured dedicated 5G channel associated with a virtual manager agent. The virtual manager agent is retained by a set of organizations using the 5G telecom network and requiring extended support services.

System 100 comprises a GUI based interface for enabling the following capabilities:

1. Enabling a device (within a 5G telecom network) and a service programmability software plane (of the 5G telecom network) to detect service issues, detecting common technical problems, and proactively responding to the service programmability software plane to address the service issues before they are reported via formal support channels.
2. Collecting information from, email notes, messaging systems, and social communication team software for transmission to a service orchestration layer using a 5G dedicated secured channel for a virtual proactive client support system.
3. Leveraging a user's audio feed, device camera, and additional omni-channel tool inputs like screen touch, application installed, issues faced, subscriber identity, user identity and save them to metadata store.
4. Integrating software and hardware with an organization's multi-level hierarchy, user details, and responsibilities and updating a metadata map with respect to a severity of detected technical issues.
5. Carving insights and filtering the information collected for detecting issues encountered by the user to determine expected results.
6. Determining a frustration level of the user facing the technical issue based on email, text, and audio feed classification via usage of hierarchical or parallel classifiers, monitoring escalation levels, revenue tagging, and updating importance weightage with reasons for the technical issues.
7. Integrating and utilizing expression maps and phrases and analyzing conversions related to an input media stream for shaping a type of content. Resulting meta data is generated and stored.
8. Autonomously initiating a conversation with a telecom support center in a network operations center (NOC) mode and developing an API infrastructure between a service orchestration and a service management plane of the 5G telecom network for guidance with the technical issue. Additionally, service plane entities (VAs) are notified with respect to the technical issues to obtain further resolution of the technical issues.

9. Communicating with customer care chatbots (i.e., software that conducts a conversation via auditory or textual methods for simulating how a human would behave as a conversational partner) located within service programmability and service management planes. Tracing further interactions with the chatbot and moving conversation framing accordingly.

System 100 of FIG. 1 includes a hardware controller 139 (i.e., specialized hardware device), a 5G apparatus 138, hardware and software devices 153, and a database 107 (e.g., a cloud-based system) interconnected through a 5G telecom network 117. Hardware controller 139 includes specialized circuitry 127 (that may include specialized software), sensors 112, and self-learning software code/hardware structure 121 (i.e., including self-learning software code). Hardware and software devices 153 may include any type of device or apparatus requiring technical support or repair including, inter alia, a server system, a computer system, an HVAC system, a vehicular control system, consumer electronics, etc. 5G apparatus 138 may include, inter alia, a smart phone, a tablet computer, a computing device, etc. 5G apparatus 138 may be Bluetooth enabled to provide connectivity to each other and any type of system. 5G apparatus 138 includes specialized circuitry 125 (that may include specialized software), sensors 110, and a GUI 142. Sensors 110 and 112 may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, voltage sensors, etc. Hardware controller 139 and 5G apparatus 138 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware controller 139 and 5G apparatus 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-8. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving hardware and software technology associated with identifying and resolving technical issues associated with hardware and software. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables the following implementation process for dynamically enabling a technical issue detection and correction process:

The process is initiated when an apparatus is enabled with respect to a service orchestration layer of 5G telecom network. Upon loading data structures from a metadata store, the apparatus initiates a connection request with a subscribed organization list. Subsequently, a dedicated 5G channel is established (i.e., security enabled) with organizational servers deploying monitoring tools with respect to enhanced channel security. All organizational subscribers are identified, and a data collection process is triggered for users associated with the subscription list. In response, omni-channel monitoring (software) tools accept an authorization signal initiated by the apparatus and a handshaking process between the omni-channel monitoring (software) tools and the apparatus is executed. Subsequently, the data structures are streamed to the service orchestration layer. The streamed data structures may include, inter alia, audio-video feeds, email contents, local object extraction information, etc. Additionally, information from an associated organization's technical support system is integrated via means of an API infrastructure fetching relevant issues associated with detected technical issues associated with hardware and software. The API infrastructure is configured to interconnect to a multi-level organization hierarchy software and hardware system for collecting employee data, work nature data, and updates to metadata structures. Collected data is parsed and classified inline using static and dynamic classifiers. Classified statistics are stored within a metadata map and a hierarchical classification process is performed to collect an importance weighting of the technical issues reported. Weighting factors collected are further filtered based on cognition enabled time, situation, and nature of the technical issues. Description contents of the technical issues are identified based on a pre-defined regular interval or interrupt driven approach and insights are inferred for detecting critical technical issues for the organization. Based on the inferred insights and the technical issues, a 5G-based virtual agent is invoked with relevant information used to communicate with service programmability and service operations planes for managing the technical issues. When associated data is received at a service operation layer, it will be signaled to proactively work on an associated technical issue before it is reported via formal channels by the organization. Upon reception of classified responses from the (remote) virtual agent, associated actions and a metadata mapper are updated accordingly. Subsequently, priority re-adjustment and conversation reframing code are injected into the system based on remote virtual agent responses. The apparatus disables the virtual agent session and auto-learn code is generated from the aforementioned process.

System 100 enables usage of 5G based virtual agents. The 5G based virtual agents comprise an improvement over 4G virtual agents as the 5G based virtual include dedicated logical channels not present within a 4G architecture. For example (in 5G telecom architecture), there is a provision to create multiple dedicated logical channels over single physical radio bearer (absent in 4G network). The dedicated logical channels comprise dissimilar data transmission characteristics (e.g., bits-per-sec, QCI levels, etc.) such that virtual agents may be tagged with a logical channel to transfer data between a 5G network and a client device. Additionally, service-oriented architecture (i.e., a service orchestration plane) is absent within 4G architecture and therefore it is difficult to deploy a virtual agent over a 4G network directly. Likewise, with respect to a service orchestration layer and network function virtualization offered by 5G telecom architecture, artificial intelligence-based services (e.g., virtual agents and data classification techniques) may be deployed over a 5G telecom network to increase a cognitive functionality of the network. A 5G telecom network may include multiple integrated services in—and and therefore it is easy for competitors to deploy virtual assistance based on a channel.

System 100 enables a virtual agent service deployed over data center servers using only available severity and priority data locally. Therefore, system 100 enables a virtual agent, (situated within a service orchestration layer of a 5G telecom network) for: communicating with customers using smart omni-channel monitoring tools, collecting information from email, and issuing monitoring systems and additional software for logging telecom service problems via means of a dedicated subscribed and secured logical channel of the 5G telecom network. System 100 is configured to collect and monitor for user actions (related to technical problems). An email monitor may be executed for collecting streamed information from resources. Static and dynamic classification code may be is applied to an associated data stream and significance weightage of technical issues may be identified. Additionally, system 100 is enabled to detect client issues and critical technical problems and proactively respond to a service plane to address the technical issues before they are reported via formal support channels. System 100 improves functionality channel-built virtual agent systems and service providers.

Figure 2:
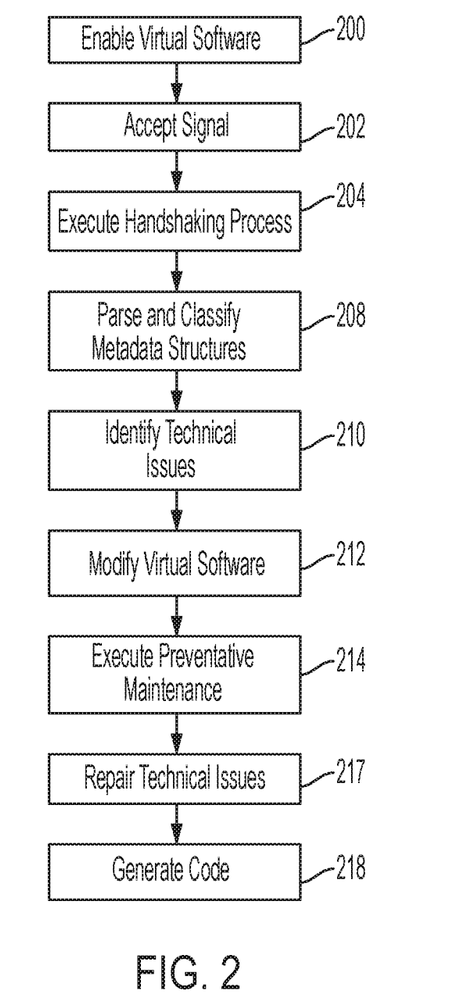
FIG. 2 illustrates an algorithm detailing a process flow enabled by the system of FIG. 1 for improving hardware and software technology associated with identifying and resolving technical issues associated with hardware and software, in accordance with embodiments of the present invention.

FIG. 2 illustrates an algorithm detailing a process flow enabled by system 100 of FIG. 1 for improving hardware and software technology associated with identifying and resolving technical issues associated with hardware and software, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware controller 139 and 5G apparatus 138. In step 200, virtual software of a hardware controller is enabled with respect to a specialized software layer of a fifth generation (5G) telecom communication network. Enabling the virtual software may include:
1. Initiating a connection request between the hardware controller and the 5G telecom communication network.
2. Establishing a dedicated security enabled 5G channel between servers deploying a multi-channel monitoring software/hardware tool
3. Identifying users of the 5G telecom communication network.
4. Triggering data collection functionality for the users.

In step 202, a signal enabled by a 5G apparatus is accepted via the multi-channel monitoring software/hardware tool. In step 204, a handshaking processes between the hardware controller and the 5G apparatus is executed. In step 208, metadata structures retrieved from the specialized software layer are parsed and classified. The parsing and classifying process may include:
1. Storing classified statistics within a metadata map associated with the metadata structures
2. Executing hierarchical classification code with respect to collecting weightage attributes associated with the technical issues.
3. Filtering the weighting attributes based on a cognition enabled time period and situation with respect to the technical issues.

In step 210, technical issues associated with hardware and software of devices connected to the 5G telecom communication network are identified based on analysis of the signal and results of step 208. In step 212, the virtual software is modified based on the technical issues. The virtual software is modified such that modified virtual software is generated for communications with respect to managing and repairing the technical issues. Additionally, data (e.g., audio-video feeds, email contents, local object extraction information associated with the technical issues, etc.) is streamed to the specialized software layer. The streamed data is integrated with technical support system information and an API infrastructure. Subsequently, the API infrastructure is connected to a multi-level organization hierarchy comprising employee data and updates to metadata structures.

In optional step 214, preventative maintenance with respect to the technical issues is performed and associated actions are generated and stored within a metadata mapper (i.e., software and hardware). In step 217, the technical issues are repaired via execution of the modified virtual software. In step 218, self-learning software code for executing future processes associated with detecting and repairing technical issues is generated.

Figure 3:
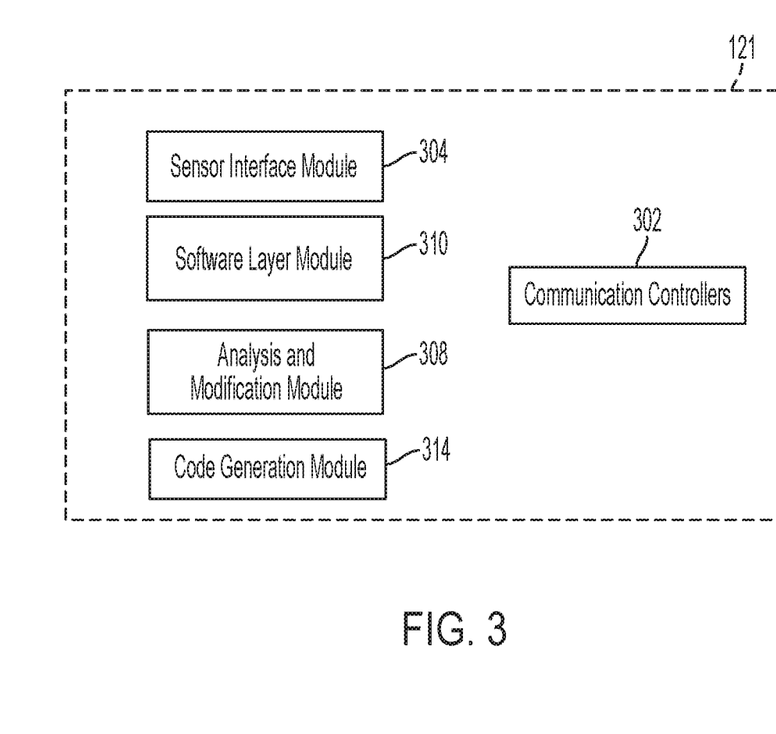
FIG. 3 illustrates an internal structural view of the self-learning software/hardware structure of FIG. 1, in accordance with embodiments of the present invention.

FIG. 3 illustrates an internal structural view of a self-learning software/hardware structure 121 (and/or circuitry 127 or 125), in accordance with embodiments of the present invention. Self-learning software/hardware structure 121 includes a sensor interface module 304, a software layer module 310, an analysis and modification module 308, a code generation module 314, and communication controllers 302. Sensor interface module 304 comprises specialized hardware and software for controlling all functions related to sensors 110 or 112 of FIG. 1. Software layer 310 comprises specialized hardware and software for controlling all functionality related control of all software layers and virtual software or agents for implementing the process described with respect to the algorithm of FIG. 2. Analysis and modification module 308 comprises specialized hardware and software for controlling all functions related to the analysis and modification steps of FIG. 2. Code generation module 314 comprises specialized hardware and software for controlling all functions related to generating machine learning feedback for generating self-learning software code for executing future virtual detection and technical issue resolution processes. Communication controllers 302 are enabled for controlling all communications between sensor interface module 304, software layer module 310, analysis and modification module 308, and code generation module 314.

Figure 4:
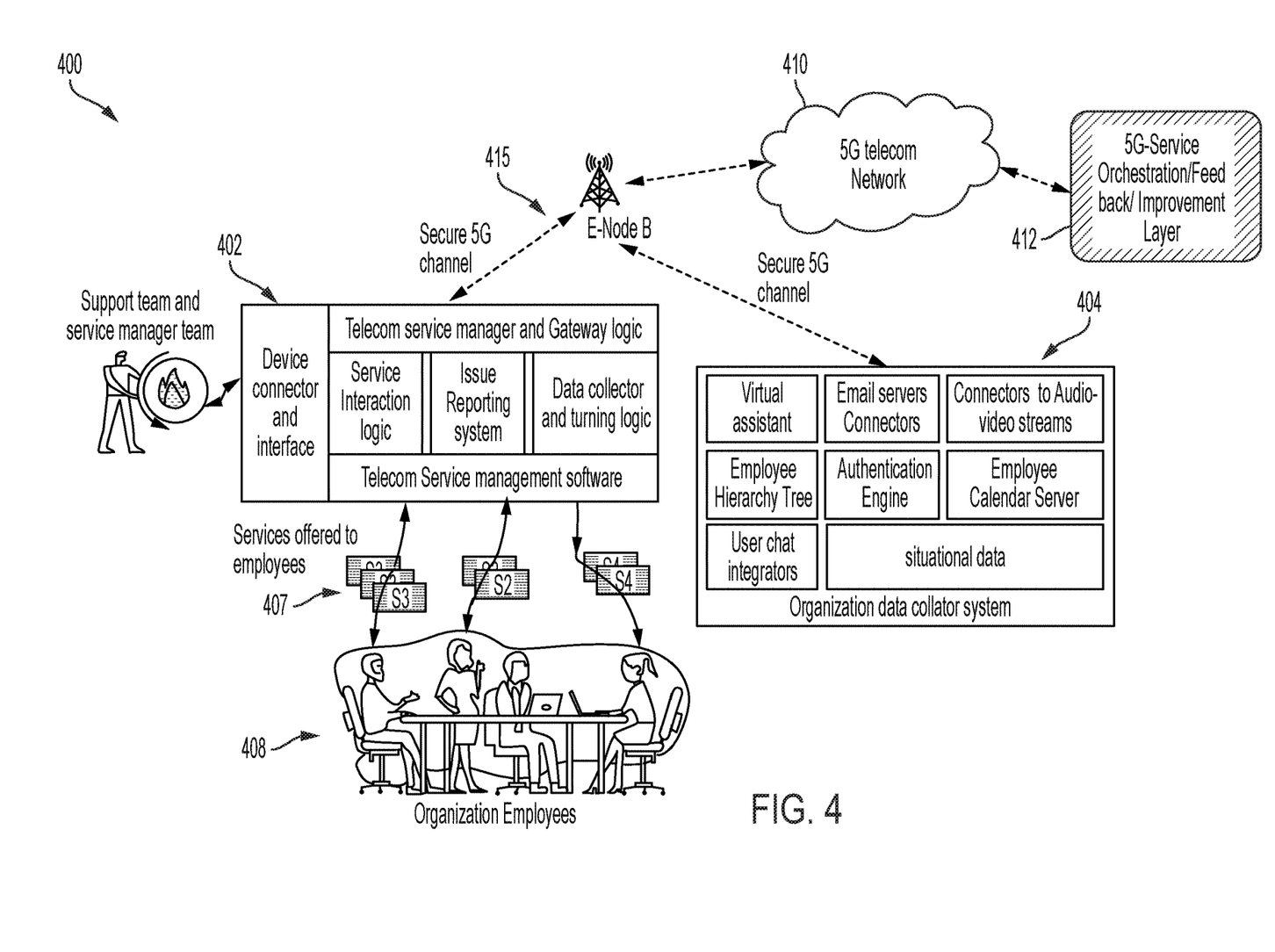
FIG. 4 illustrates a system associated with an organizational service distribution model, in accordance with embodiments of the present invention.

FIG. 4 illustrates a system 400 associated with an organizational service distribution model, in accordance with embodiments of the present invention. System 400 includes a device 402 (offering services 407 for employees 408) and an organizational data collator system 404 connected to a 5G orchestration layer 412 via a 5G telecom network 410. Device 402 comprises telecom service logic, service interaction logic, an issue reporting system, data collator logic, and telecom software for executing a technical issue diagnosis process via a secured 5G channel 415. Organizational data collator system 404 comprises a virtual assistant, email servers, audio/video streams, a hierarchy tree, an authentication engine, a calendar server, integrators, and situational data for communications with device 402. 5G orchestration layer 412 is configured to control functionality associated with the technical issue diagnosis process.

Figure 5:
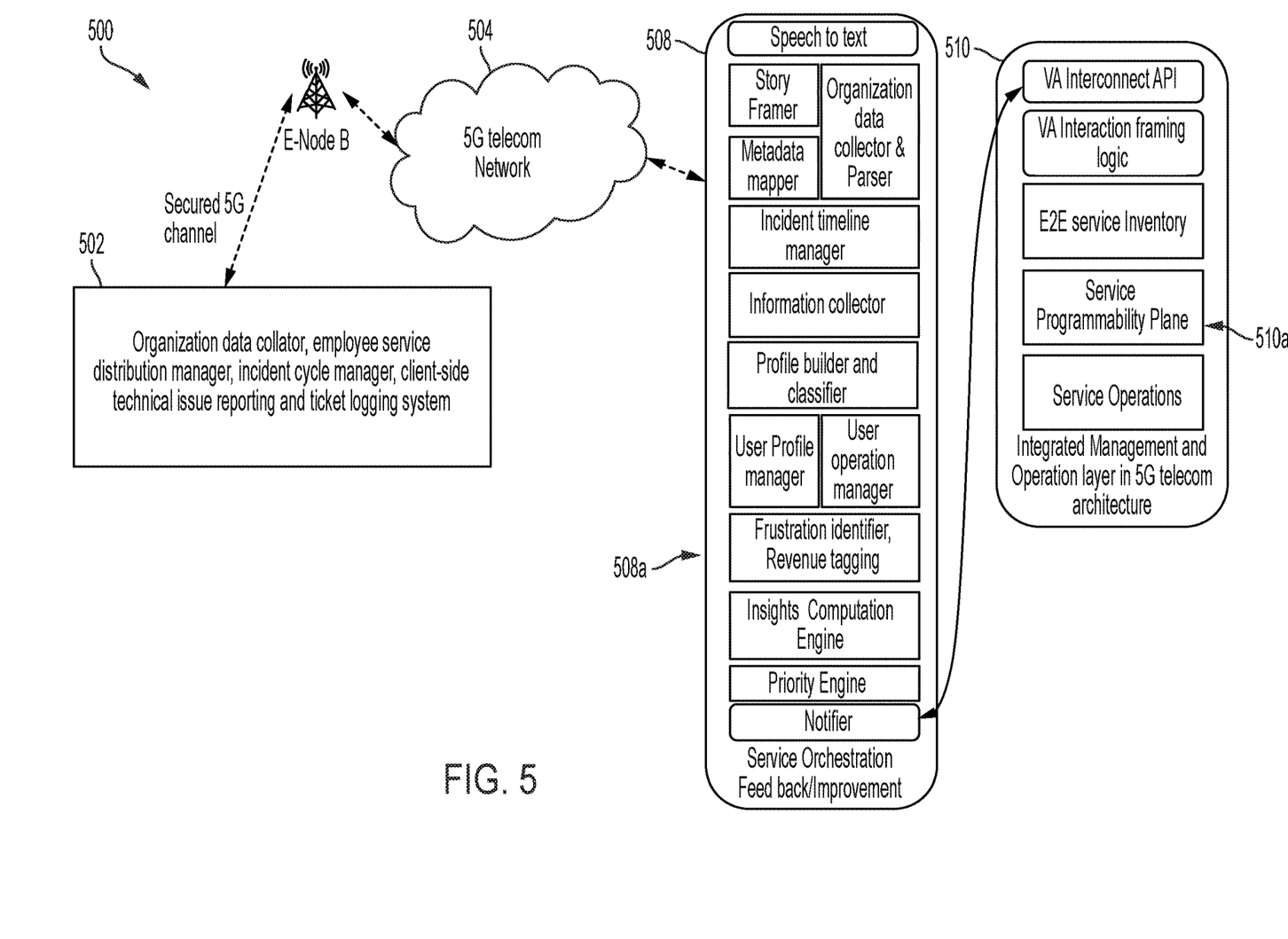
FIG. 5 illustrates an operational management framework, in accordance with embodiments of the present invention.

FIG. 5 illustrates an operational management framework 500, in accordance with embodiments of the present invention. Operational management framework 500 includes a data collator 502 connected to a service orchestrator 508 and an integrated management system 510 via a 5G telecom network 504. Data collator 502 comprises a technical issue reporting system. Service orchestrator 508 comprises modules 508a for generating feedback and improvements/repairs with respect to hardware and software requiring attention.

Integrated management system 510 comprises logic 510a for controlling functionality associated with 5G telecom architecture.

Figure 6:
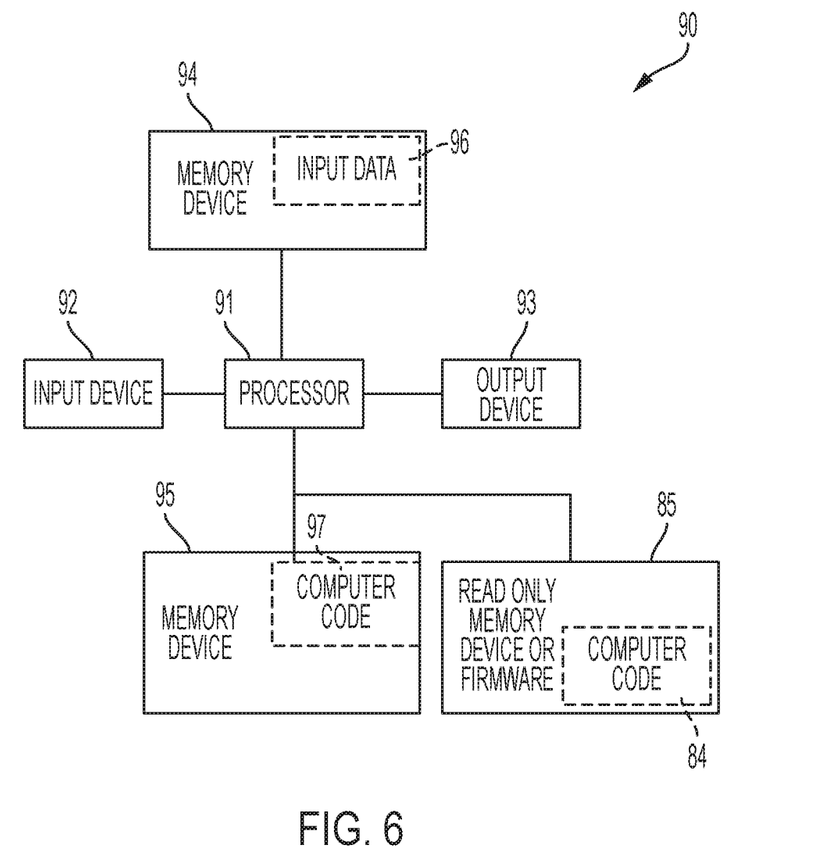
FIG. 6 illustrates a computer system used by the system of FIG. 1 for improving hardware and software technology associated with identifying and resolving technical issues associated with hardware and software, in accordance with embodiments of the present invention.

FIG. 6 illustrates a computer system 90 (e.g., hardware controller 138 and/or 5G apparatus 138 of FIG. 1) used by or comprised by the system of FIG. 1 for improving hardware and software technology associated with identifying and resolving technical issues associated with hardware and software, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving hardware and software technology associated with identifying and resolving technical issues associated with hardware and software. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve hardware and software technology associated with identifying and resolving technical issues associated with hardware and software. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving hardware and software technology associated with identifying and resolving technical issues associated with hardware and software. In another embodiment, the invention provides a business method that performs the process steps of the invention on a subscription, advertising, and/or fee basis. That is, a service supplier, such as a Solution Integrator, could offer to enable a process for improving hardware and software technology associated with identifying and resolving technical issues associated with hardware and software. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a configuration of hardware and software, any configuration of hardware and software, as would be known to a person of ordinary skill in the art, may be utilized for the purposes stated supra in conjunction with the computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
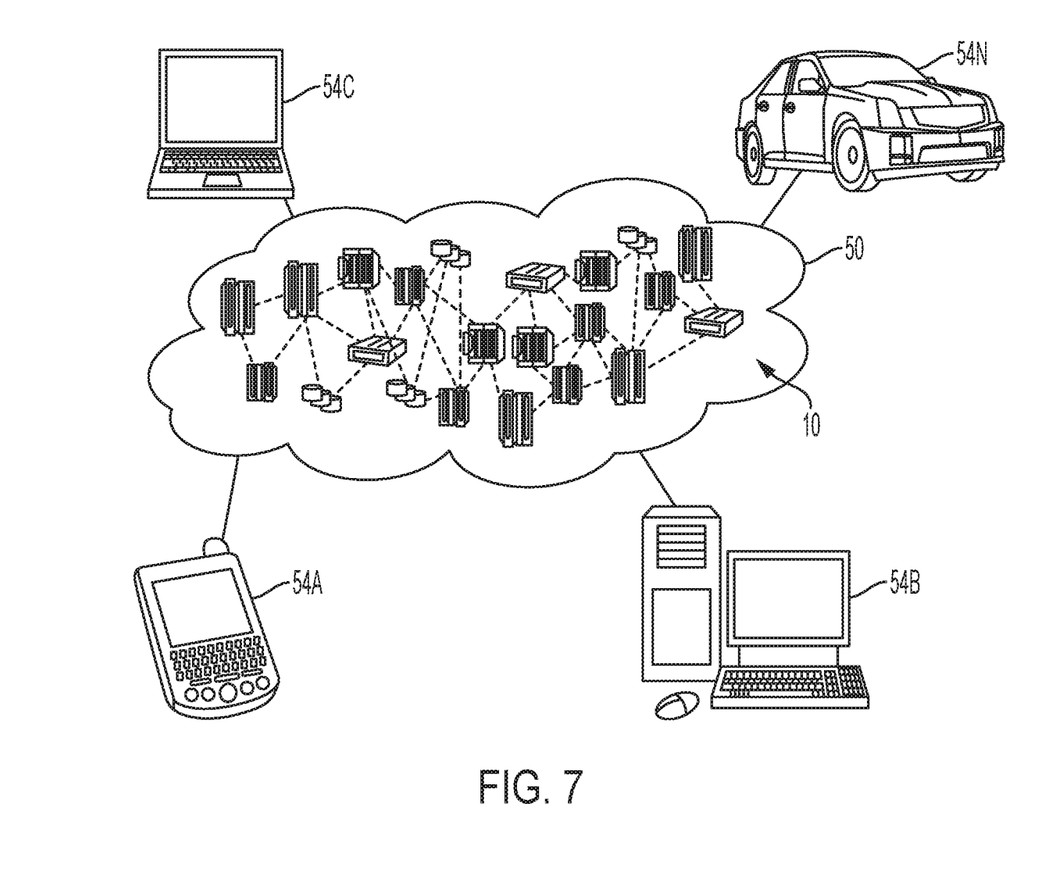
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
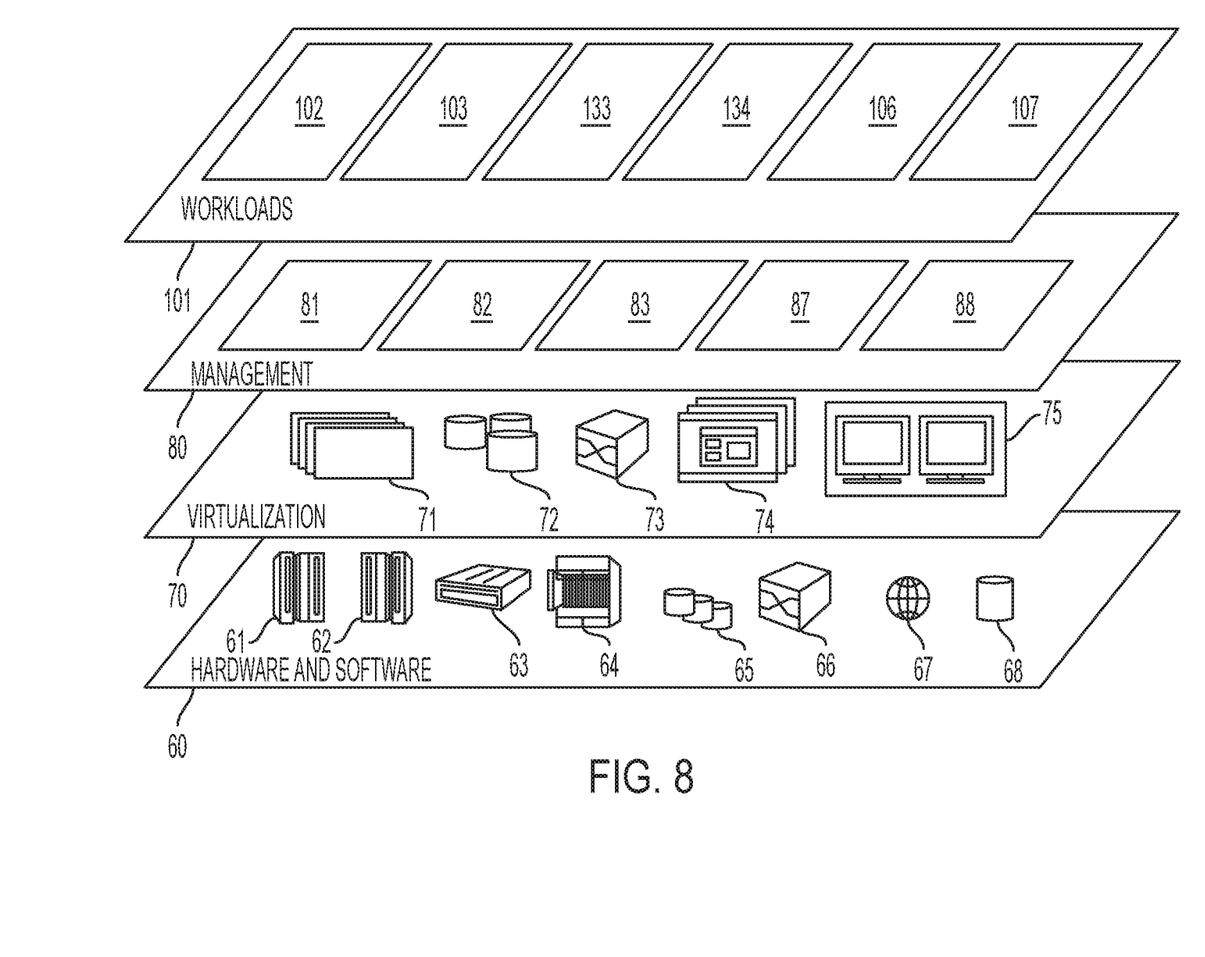
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving hardware and software technology associated with identifying and resolving technical issues associated with hardware and software 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A virtual detection and issue modification method comprising:
  enabling, by a processor of a hardware controller, virtual software of said hardware controller with respect to a specialized software layer of a fifth generation (5G) telecom communication network;
  accepting, by said processor via a multi-channel monitoring tool, a signal enabled by a 5G apparatus;
  executing, by said processor in response to said accepting, a handshaking processes between said hardware controller and said 5G apparatus;
  parsing and classifying, by said processor in response to said handshaking process, metadata structures retrieved from said specialized software layer;
  identifying, by said processor based on analysis of said signal and results of said parsing and classifying, technical issues associated with hardware and software of devices connected to said 5G telecom communication network;
  modifying, by said processor based on said technical issues, said virtual software such that modified virtual software is generated for communications with respect to managing and repairing said technical issues;
  repairing, by said processor executing said modified virtual software, said technical issues; and
  generating, by said processor, self-learning software code for executing future processes associated with executing said virtual detection and issue modification method.

2. The method of claim 1, wherein said enabling said virtual software comprises:
  initiating a connection request between said hardware controller and said 5G telecom communication network;
  establishing in response to said connection request, a dedicated security enabled 5G channel between servers deploying said multi-channel monitoring tool;
  identifying users of said 5G telecom communication network; and
  triggering data collection functionality for said users.

3. The method of claim 1, further comprising:
  streaming, by said processor, data to said specialized software layer, wherein said data comprises audio-video feeds, email contents, and local object extraction information associated with said technical issues;
  integrating, by said processor, said data and technical support system information with an API infrastructure; and
  connecting, by said processor, said API infrastructure to a multi-level organization hierarchy comprising employee data and updates to said metadata structures, wherein said modifying is based on results of said connecting.

4. The method of claim 1, wherein said parsing and classifying comprises:
  storing classified statistics within a metadata map associated with said metadata structures; and
  executing hierarchical classification code with respect to collecting weightage attributes associated with said technical issues.

5. The method of claim 4, further comprising:
  filtering said weighting attributes based on a cognition enabled time period and situation with respect to said technical issues.

6. The method of claim 1, further comprising:
  before said repairing, performing by said processor, preventative maintenance with respect to said technical issues;
  generating, by said processor, actions associated with said preventative maintenance; and
  storing said actions within a metadata mapper.

7. The method of claim 1, further comprising:
  providing at least one support service for at least one of creating, integrating, hosting, maintaining, and deploying computer-readable code in the hardware controller, said code being executed by the computer processor to implement: said enabling, said accepting, said executing, said parsing and classifying, said identifying, said modifying, said repairing, and said generating.

8. A computer program product, comprising a computer readable hardware storage device storing a computer readable program code, said computer readable program code comprising an algorithm that when executed by a processor of hardware controller implements a virtual detection and issue modification method, said method comprising:
  enabling, by said processor, virtual software of said hardware controller with respect to a specialized software layer of a fifth generation (5G) telecom communication network;
  accepting, by said processor via a multi-channel monitoring tool, a signal enabled by a 5G apparatus;
  executing, by said processor in response to said accepting, a handshaking processes between said hardware controller and said 5G apparatus;
  parsing and classifying, by said processor in response to said handshaking process, metadata structures retrieved from said specialized software layer;
  identifying, by said processor based on analysis of said signal and results of said parsing and classifying, technical issues associated with hardware and software of devices connected to said 5G telecom communication network;
  modifying, by said processor based on said technical issues, said virtual software such that modified virtual software is generated for communications with respect to managing and repairing said technical issues;
  repairing, by said processor executing said modified virtual software, said technical issues; and
  generating, by said processor, self-learning software code for executing future processes associated with executing said virtual detection and issue modification method.

9. The computer program product of claim 8, wherein said enabling said virtual software comprises:
  initiating a connection request between said hardware controller and said 5G telecom communication network;
  establishing in response to said connection request, a dedicated security enabled 5G channel between servers deploying said multi-channel monitoring tool;
  identifying users of said 5G telecom communication network; and
  triggering data collection functionality for said users.

10. The computer program product of claim 8, wherein said method further comprises:
  streaming, by said processor, data to said specialized software layer, wherein said data comprises audio-video feeds, email contents, and local object extraction information associated with said technical issues;

integrating, by said processor, said data and technical support system information with an API infrastructure; and connecting, by said processor, said API infrastructure to a multi-level organization hierarchy comprising employee data and updates to said metadata structures, wherein said modifying is based on results of said connecting.

11. The computer program product of claim 8, wherein said parsing and classifying comprises:

storing classified statistics within a metadata map associated with said metadata structures; and executing hierarchical classification code with respect to collecting weightage attributes associated with said technical issues.

12. The computer program product of claim 11, wherein said method further comprises:

filtering said weighting attributes based on a cognition enabled time period and situation with respect to said technical issues.

13. The computer program product of claim 8, wherein said method further comprises:

before said repairing, performing by said processor, preventative maintenance with respect to said technical issues;

generating, by said processor, actions associated with said preventative maintenance; and storing said actions within a metadata mapper.

14. A hardware controller comprising a processor coupled to a computer-readable memory unit, said memory unit comprising instructions that when executed by the processor implements a virtual detection and issue modification method comprising:

enabling, by said processor, virtual software of said hardware controller with respect to a specialized software layer of a fifth generation (5G) telecom communication network;

accepting, by said processor via a multi-channel monitoring tool, a signal enabled by a 5G apparatus;

executing, by said processor in response to said accepting, a handshaking processes between said hardware controller and said 5G apparatus;

parsing and classifying, by said processor in response to said handshaking process, metadata structures retrieved from said specialized software layer;

identifying, by said processor based on analysis of said signal and results of said parsing and classifying, technical issues associated with hardware and software of devices connected to said 5G telecom communication network;

modifying, by said processor based on said technical issues, said virtual software such that modified virtual software is generated for communications with respect to managing and repairing said technical issues;

repairing, by said processor executing said modified virtual software, said technical issues; and generating, by said processor, self-learning software code for executing future processes associated with executing said virtual detection and issue modification method.

15. The hardware controller of claim 14, wherein said enabling said virtual software comprises:

initiating a connection request between said hardware controller and said 5G telecom communication network;

establishing in response to said connection request, a dedicated security enabled 5G channel between servers deploying said multi-channel monitoring tool;

identifying users of said 5G telecom communication network; and triggering data collection functionality for said users.

16. The hardware controller of claim 14, wherein said method further comprises:

streaming, by said processor, data to said specialized software layer, wherein said data comprises audio-video feeds, email contents, and local object extraction information associated with said technical issues;

integrating, by said processor, said data and technical support system information with an API infrastructure; and connecting, by said processor, said API infrastructure to a multi-level organization hierarchy comprising employee data and updates to said metadata structures, wherein said modifying is based on results of said connecting.

17. The hardware controller of claim 14, wherein said parsing and classifying comprises:

storing classified statistics within a metadata map associated with said metadata structures; and executing hierarchical classification code with respect to collecting weightage attributes associated with said technical issues.

18. The hardware controller of claim 17, wherein said method further comprises:

filtering said weighting attributes based on a cognition enabled time period and situation with respect to said technical issues.

19. The hardware controller of claim 14, wherein said method further comprises:

before said repairing, performing by said processor, preventative maintenance with respect to said technical issues;

generating, by said processor, actions associated with said preventative maintenance; and storing said actions within a metadata mapper.

20. The hardware controller of claim 14, wherein said technical issues comprise circuitry issues or firmware issues associated with said hardware and said software.

\* \* \* \* \*